(12) United States Patent
Hill et al.

(10) Patent No.: US 12,726,010 B2
(45) Date of Patent: Sep. 1, 2026

(54) CORD HOLDER FOR A KITCHEN APPLIANCE

(71) Applicant: WHIRLPOOL CORPORATION, Benton Harbor, MI (US)

(72) Inventors: Eric A. Hill, Chicago, IL (US); Brandon T. Mock, St. Joseph, MI (US); Ryan J. Rutter, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 336 days.

(21) Appl. No.: 18/357,608

(22) Filed: Jul. 24, 2023

(65) Prior Publication Data

US 2025/0031906 A1 Jan. 30, 2025

(51) Int. Cl.

*H02G 11/02* (2006.01)
*A47J 43/07* (2006.01)
*B65H 75/02* (2006.01)
*B65H 75/08* (2006.01)
*B65H 75/14* (2006.01)

(52) U.S. Cl.

CPC .............. *H02G 11/02* (2013.01); *A47J 43/07* (2013.01); *A47J 43/0705* (2013.01); *B65H 75/02* (2013.01); *B65H 75/08* (2013.01); *B65H 75/14* (2013.01); *A47J 2043/0744* (2013.01); *B65H 2701/34* (2013.01)

(58) Field of Classification Search

CPC .................... A47J 43/07; A47J 43/0705; A47J 2043/0744; B65H 75/02; B65H 75/08; B65H 75/14; H02G 11/02

See application file for complete search history.

(56) References Cited

U.S. PATENT DOCUMENTS

| | | | | | |
|---|---|---|---|---|---|
| 1,696,495 | A * | 12/1928 | Malling | H02G 11/02 | 191/12 R |
| 2,231,001 | A * | 2/1941 | Engstrom | H02G 11/02 | 242/406 |
| 2,261,046 | A | 10/1941 | Anderson | | |
| 2,565,339 | A * | 8/1951 | Anderson | H02G 11/02 | 242/601 |
| 2,789,798 | A * | 4/1957 | Brace | A47J 43/044 | 310/91 |
| 4,150,798 | A * | 4/1979 | Aragon | B65H 75/406 | 242/405 |
| 4,369,487 | A | 1/1983 | Carlow | | |
| 4,645,905 | A * | 2/1987 | Ming | F16C 11/10 | 219/385 |

(Continued)

FOREIGN PATENT DOCUMENTS

| | | | |
|---|---|---|---|
| CN | 106805795 | A | 6/2017 |
| DE | 2632080 | A1 | 1/1978 |

(Continued)

*Primary Examiner* — Taylor Morris

(74) *Attorney, Agent, or Firm* — Price Heneveld LLP

(57) ABSTRACT

A kitchen appliance includes a body, a power cord extending outward from the body, and a cord holder configured to receive the power cord via wrapping of the power cord about the cord holder. The cord holder is operable between an attached condition and a detached condition. In the attached condition, the cord holder is attached to the body via magnetic attraction. In the detached condition, the cord holder is detached from the body.

15 Claims, 4 Drawing Sheets

(56) References Cited

U.S. PATENT DOCUMENTS

| | | | | | |
|---|---|---|---|---|---|
| 4,741,259 | A * | 5/1988 | Ogata | A47J 31/542 | 392/467 |
| 4,901,938 | A * | 2/1990 | Cantley | B65H 75/44 | 242/378.1 |
| 4,922,464 | A * | 5/1990 | Kamprath | A47J 43/044 | 366/144 |
| 5,531,333 | A * | 7/1996 | Vara | H01R 13/60 | 242/395 |
| 5,613,648 | A | 3/1997 | Paavila | | |
| 5,984,224 | A * | 11/1999 | Yang | H04M 1/15 | 242/402 |
| 6,164,582 | A * | 12/2000 | Vara | B65H 75/42 | 242/395 |
| 6,483,033 | B1 * | 11/2002 | Simoes | H05K 7/1449 | 242/360 |
| 6,503,097 | B2 * | 1/2003 | Archambault | H01R 13/60 | 439/4 |
| 6,957,978 | B2 * | 10/2005 | Zoller | H02G 11/02 | 439/445 |
| 7,077,693 | B1 * | 7/2006 | Symons | B65H 75/4473 | 439/501 |
| 7,108,544 | B2 * | 9/2006 | Zoller | H02G 11/02 | 439/445 |
| 9,366,360 | B2 | 6/2016 | Alcorn | | |
| D774,383 | S * | 12/2016 | Kennedy | D8/358 | |
| 9,791,654 | B2 * | 10/2017 | Fordham | G02B 6/4457 | |
| 10,660,405 | B2 * | 5/2020 | Schneider | A43C 11/165 | |
| 11,658,445 | B1 | 5/2023 | Aumiller | | |
| 2006/0059666 | A1 | 3/2006 | Senink | | |
| 2010/0224714 | A1 * | 9/2010 | Winther | B65H 75/446 | 242/406 |
| 2012/0077372 | A1 * | 3/2012 | Montena | B65H 75/28 | 242/405 |
| 2013/0119179 | A1 * | 5/2013 | Piszkiewicz | B65H 75/4473 | 242/395 |
| 2017/0081146 | A1 * | 3/2017 | Dockray | B65H 75/446 | |
| 2019/0313855 | A1 * | 10/2019 | Ambrose | B01F 35/42 | |
| 2020/0354185 | A1 * | 11/2020 | Kohli | B65H 75/2209 | |
| 2022/0385049 | A1 * | 12/2022 | Fan | H02J 7/02 | |
| 2023/0120365 | A1 * | 4/2023 | Casey | B65H 75/285 | 242/580 |
| 2024/0292978 | A1 * | 9/2024 | Xu | A47J 43/044 | |

FOREIGN PATENT DOCUMENTS

| | | | | |
|---|---|---|---|---|
| DE | 3820007 | C1 * | 8/1989 | A47J 43/0705 |
| DE | 4123267 | A1 * | 1/1993 | A47J 37/0871 |
| DE | 19822635 | A1 * | 12/1999 | H02G 11/00 |
| GB | 836306 | A * | 6/1960 | B65H 75/14 |
| GB | 2345650 | A * | 7/2000 | A47J 43/07 |
| WO | WO-9844820 | A1 * | 10/1998 | A47J 42/38 |
| WO | 2022112800 | A1 | 2/2022 | |

* cited by examiner

CORD HOLDER FOR A KITCHEN APPLIANCE

BACKGROUND OF THE DISCLOSURE

The present disclosure generally relates to a kitchen appliance that includes a cord holder. More specifically, the present disclosure relates to a kitchen appliance that includes a cord holder that is operable to be magnetically coupled to a body of the kitchen appliance.

SUMMARY OF THE DISCLOSURE

According to one aspect of the present disclosure, a kitchen appliance includes a body, a power cord extending outward from the body, and a cord holder configured to receive the power cord via wrapping of the power cord about the cord holder. The cord holder is operable between an attached condition and a detached condition. In the attached condition, the cord holder is attached to the body via magnetic attraction. In the detached condition, the cord holder is detached from the body.

According to another aspect of the present disclosure, a cord holder for selective attachment to an appliance includes a barrel about which a power cord of the appliance is configured to be wound. The barrel has a first end and a second end opposite the first end. The cord holder also includes a first flange extending outward from the first end of the barrel. The cord holder further includes a second flange extending outward from the second end of the barrel and having a substantially stadium-shaped outer periphery that is elongated in a longitudinal direction of the second flange. The second flange defines a channel that interrupts the substantially stadium-shaped outer periphery of the second flange and extends across the second flange in a direction substantially perpendicular to the longitudinal direction. The cord holder additionally includes a magnet that is configured to magnetically attach the cord holder to a body of the appliance in an attached condition of the cord holder. The magnet is oriented such that a side of the first flange opposite the barrel is configured to abut the body in the attached condition of the cord holder.

According to yet another aspect of the present disclosure, a kitchen appliance includes a body, a power cord extending outward from the body, and a cord holder configured to receive the power cord via wrapping of the power cord about the cord holder. The cord holder is operable between an attached condition and a detached condition. In the attached condition, the cord holder is attached to the body via magnetic attraction. In the detached condition, the cord holder is detached from the body. The cord holder includes a barrel about which the power cord is configured to be wound. The barrel has a first end and a second end opposite the first end. The cord holder also includes a first flange extending outward from the first end of the barrel. The cord holder further includes a second flange extending outward from the second end of the barrel and having a substantially stadium-shaped outer periphery that is elongated in a longitudinal direction of the second flange. The second flange defines a channel that interrupts the substantially stadium-shaped outer periphery of the second flange and extends across the second flange in a direction substantially perpendicular to the longitudinal direction. The cord holder additionally includes a magnet that is configured to magnetically attach the cord holder to the body of the kitchen appliance in the attached condition of the cord holder. The magnet is oriented such that a side of the first flange opposite the barrel is configured to abut the body in the attached condition of the cord holder.

These and other features, advantages, and objects of the present disclosure will be further understood and appreciated by those skilled in the art by reference to the following specification, claims, and appended drawings.

Figure 1:
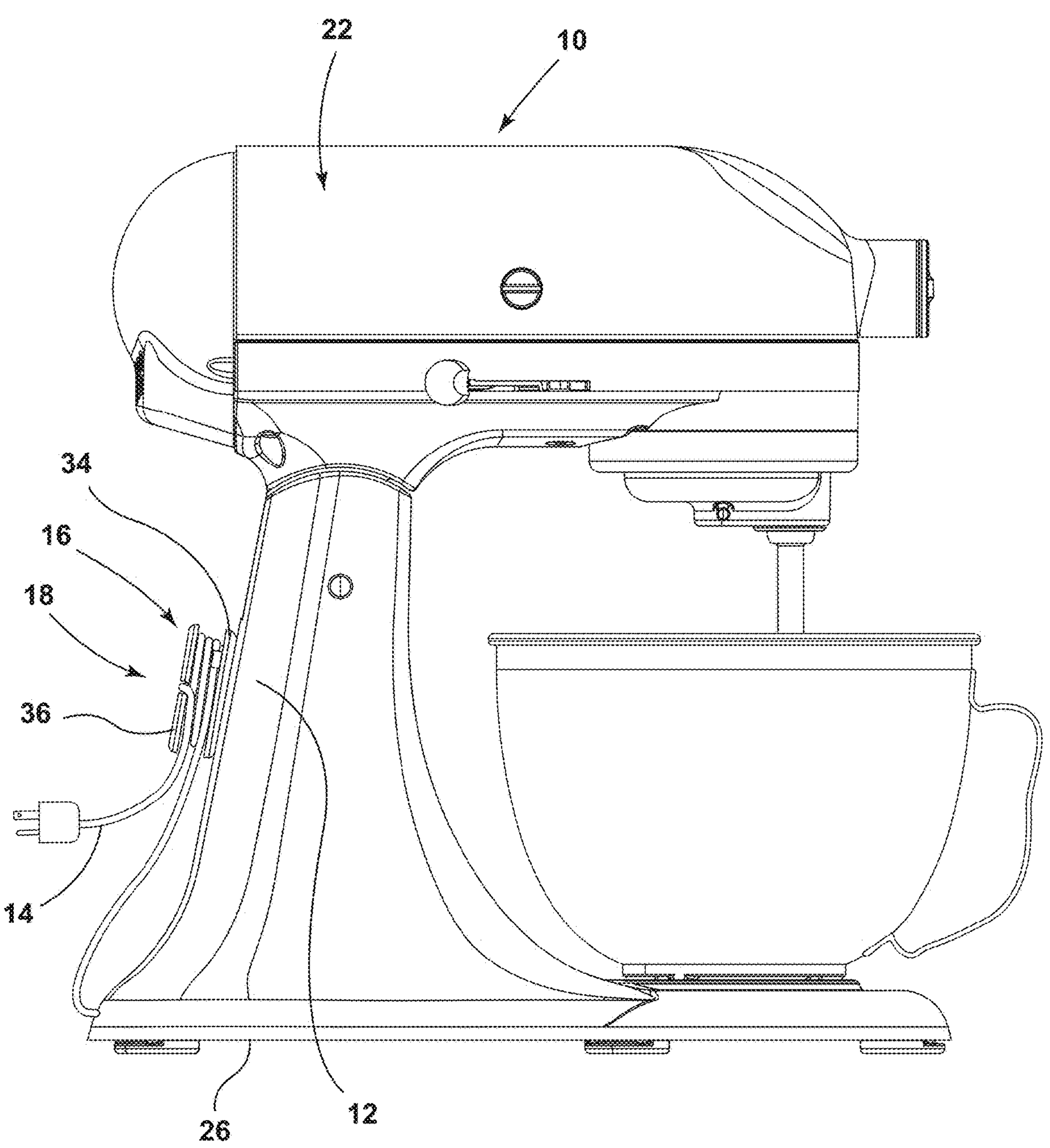
FIG. 1 is a side elevational view of a kitchen appliance illustrating a cord holder attached to the kitchen appliance and a power cord of the kitchen appliance wound about the cord holder.

The components in the figures are not necessarily to scale, emphasis instead being placed upon illustrating the principles described herein.

DETAILED DESCRIPTION

The present illustrated embodiments reside primarily in combinations of method steps and apparatus components related to a cord holder for a kitchen appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Referring now to FIGS. 1-6, a kitchen appliance 10 includes a body 12. A power cord 14 extends outward from the body 12. A cord holder 16 that is configured to receive the power cord 14 via wrapping of the power cord 14 about the cord holder 16 is operable between an attached condition 18, wherein the cord holder 16 is attached to the body 12 via magnetic attraction, and a detached condition 20, wherein the cord holder 16 is detached from the body 12.

Referring now to FIG. 1, an appliance 10 is illustrated. In various implementations, the appliance 10 may be the kitchen appliance 10. In some implementations, the appliance 10 may be a countertop kitchen appliance 10. In the embodiment illustrated in FIG. 1, the appliance 10 is illustrated as a stand mixer 22. Referring still to FIG. 1, the appliance 10 includes a body 12. The body 12 can be formed of a plurality of components of the appliance 10, in various implementations. In some examples, the body 12 comprises a ferromagnetic metal, such as iron. It is contemplated that the body 12 may be formed of a variety of types of materials. In some implementations, the body 12 may include a magnet 24.

Referring still to FIG. 1, the appliance 10 is an electric appliance 10 that includes a cord for electrically coupling electrical components of the appliance 10 (e.g., motor, controls, etc.) with a power source (not shown). In the embodiment illustrated in FIG. 1, the stand mixer 22 includes a power cord 14 that extends outward from the body 12 of the stand mixer 22 proximate to a base 26 of the stand mixer 22.

Figure 2:
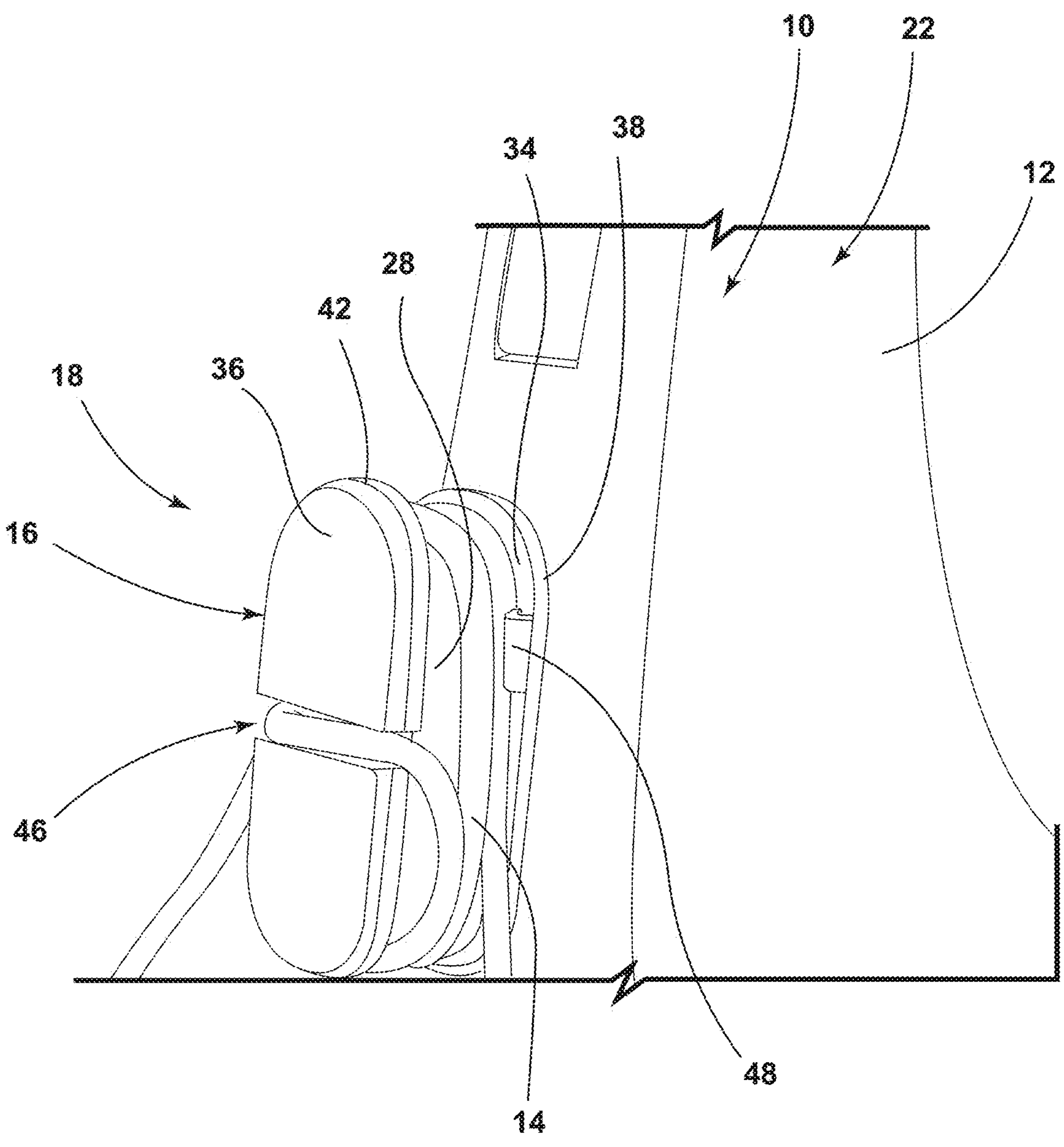
FIG. 2 is a top perspective view of a portion of the kitchen appliance illustrating a cord holder in an attached condition, wherein the cord holder is magnetically attached to a body of the kitchen appliance.
Figure 3:
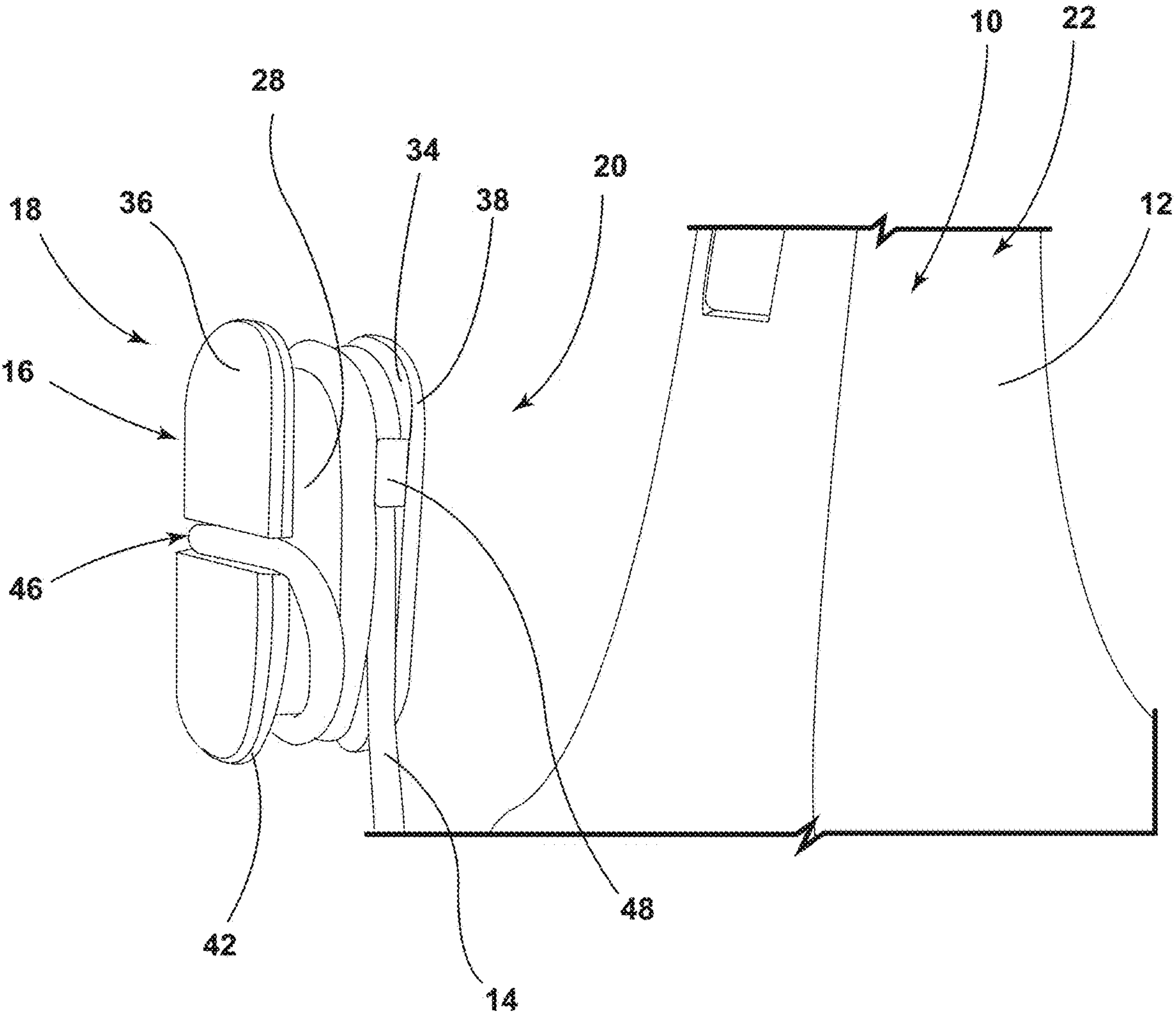
FIG. 3 is a top perspective view of a portion of the kitchen appliance illustrating the cord holder in a detached condition, wherein the cord holder is detached from the body of the kitchen appliance.

Referring now to FIGS. 1-3, the appliance 10 includes the cord holder 16. The cord holder 16 is configured to receive the power cord 14 via wrapping of the power cord 14 about the cord holder 16. In operation, a user may wrap an excess length of power cord 14 about the cord holder 16 to tidily store the excess length of the power cord 14. The cord holder 16 is operable between the attached condition 18 and the detached condition 20. As illustrated in FIG. 1, the cord holder 16 is attached to the body 12 of the kitchen appliance 10 via magnetic attraction in the attached condition 18 of the cord holder 16. In the detached condition 20 of the cord holder 16, the cord holder 16 is detached from the body 12, as illustrated in FIG. 3.

Figure 4:
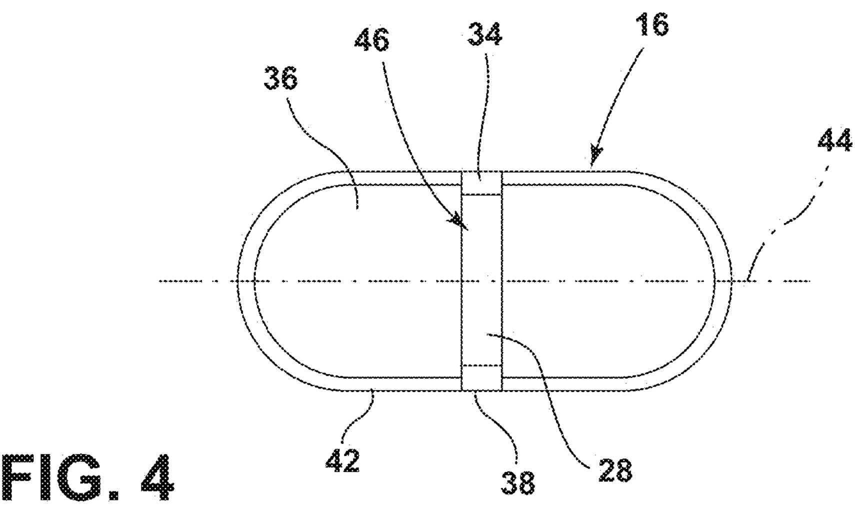
FIG. 4 is a top plan view of a cord holder illustrating a first flange, a barrel, and a second flange that defines a channel.
Figure 5:
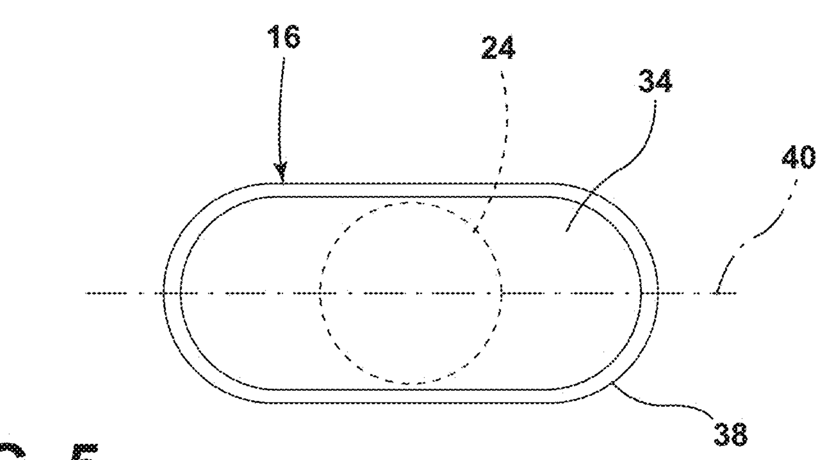
FIG. 5 is a bottom plan view of a cord holder illustrating the first flange and a magnet in phantom.
Figure 6:
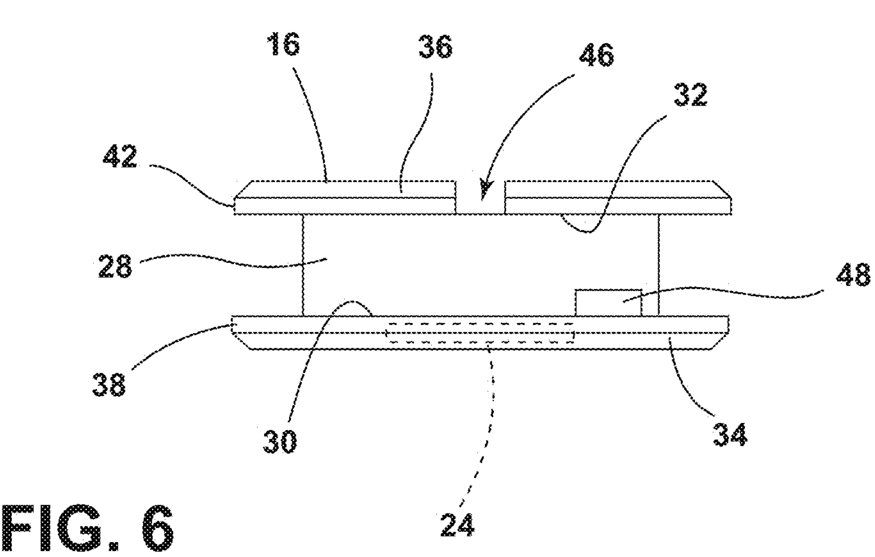
FIG. 6 is a side elevational view of the cord holder illustrating the first flange, the second flange, and the barrel extending therebetween.

Referring now to FIGS. 2-6, the cord holder 16 includes a barrel 28 about which the power cord 14 is configured to be wound. The barrel 28 includes a first end 30 and a second end 32 opposite the first end 30, as illustrated in FIG. 6. In the embodiment illustrated in FIGS. 2-6, the cord holder 16 includes the barrel 28, a first flange 34 extending outward from the first end 30 of the barrel 28, and a second flange 36 extending outward from the second end 32 of the barrel 28 opposite the first end 30. In some implementations, the first flange 34 has a substantially stadium-shaped outer periphery 38 that is elongated in a longitudinal direction 40 of the first flange 34. For example, as illustrated in FIG. 5, the outer periphery 38 of the first flange 34 is substantially stadium-shaped. In the illustrated embodiment, the outer periphery 38 of the first flange 34 has opposing sides that extend substantially parallel to the longitudinal direction 40 of the first flange 34 and generally semicircular longitudinal ends opposite each other. In some implementations, the second flange 36 has a substantially stadium-shaped outer periphery 42 that is elongated in a longitudinal direction 44 of the second flange 36. For example, as illustrated in FIG. 4, the outer periphery 42 of the second flange 36 is substantially stadium-shaped.

Referring still to FIGS. 2-6, in some implementations, the second flange 36 of the cord holder 16 defines a channel 46 for receiving a portion of the power cord 14. The second flange 36 may wholly define the channel 46 or may define the channel 46 in cooperation with other portions of the cord holder 16, such as the barrel 28 of the cord holder 16. As illustrated in FIGS. 2 and 3, the channel 46 is configured to receive a portion of the power cord 14 therein. In various implementations, the first flange 34 is formed of a resiliently deformable material, and the channel 46 is sized such that insertion of the power cord 14 into the channel 46 causes the power cord 14 to contact and elastically deform the channel-defining portions of the second flange 36, such that the power cord 14 is yieldingly retained within the channel 46 by the second flange 36.

As illustrated in FIGS. 2, 3, and 4, in some implementations, the channel 46 interrupts the outer periphery 42 of the second flange 36 and extends across the second flange 36 in a direction that is substantially perpendicular to the longitudinal direction 44 of the second flange 36. In the embodiment illustrated in FIG. 4, the channel 46 interrupts both sides of the outer periphery 42 of the second flange 36 that extend parallel to the longitudinal direction 44 of the second flange 36. In the embodiment illustrated in FIG. 4, the channel 46 is defined at a longitudinal center point of the second flange 36.

Referring now to FIGS. 2, 3, and 6, the cord holder 16 can include a retention tab 48. The retention tab 48 extends outward from the first flange 34 toward the second flange 36 and is in a spaced-relationship with the barrel 28 of the cord holder 16. As illustrated in FIGS. 2 and 3, the retention tab 48 is in a spaced-relationship with the barrel 28 and is configured to selectively retain a portion of the power cord 14 between the retention tab 48 and the barrel 28 of the cord holder 16.

Referring now to FIGS. 2-6, the cord holder 16 may include a magnet 24 for magnetically attaching the cord holder 16 to the body 12 of the appliance 10. In various implementations, the cord holder 16 may include a plurality and/or an array of magnets 24 for magnetically attaching the cord holder 16 to the body 12 of the appliance 10. In an exemplary embodiment, the cord holder 16 includes an array of magnets 24 that attach and orient the cord holder 16 to the body 12 of the appliance 10. It is contemplated that, in some implementations, the body 12 of the appliance 10 may include a magnet 24 and the cord holder 16 may include a ferromagnetic material that is attracted to the magnet 24 of the appliance 10. In the embodiment illustrated in FIGS. 5 and 6, the cord holder 16 includes the magnet 24. The magnet 24 is configured to attach the cord holder 16 to the body 12 in the attached condition 18 of the cord holder 16. In various implementations, the magnet 24 is oriented such that a side of the first flange 34 that is opposite the barrel 28 of the cord holder 16 is configured to abut the body 12 of the appliance 10 in the attached condition 18 of the cord holder 16. The magnet 24 may be coupled to various portions of the cord holder 16. For example, the magnet 24 may be coupled to and/or disposed within the barrel 28 of the cord holder 16, in some implementations. In various implementations, the magnet 24 is coupled to the first flange 34 of the cord holder 16. For example, the magnet 24 may be a portion of the first flange 34 of the cord holder 16 that is disposed within and/or externally of the adjacent portions of the first flange 34. In the embodiment illustrated in FIGS. 5 and 6, the magnet 24 is disposed within the first flange 34 of the cord holder 16.

In operation of an exemplary embodiment of a kitchen appliance 10, such as the stand mixer 22 illustrated in FIG.

1, a user places the stand mixer 22 on a countertop proximate to an electrical outlet into which a plug coupled to the power cord 14 of the stand mixer 22 may be inserted to supply power to the stand mixer 22. The user identifies that the length of the power cord 14 is greater than the distance between the stand mixer 22 and the electrical outlet, such that an extent of the power cord 14 will be slacked and rest untidily on the countertop. Next, the user removes the cord holder 16 (currently empty) from the attached condition 18, wherein the cord holder 16 was magnetically attached to a rear side of the stand mixer 22, and winds the slacked extent of power cord 14 about the barrel 28 of the cord holder 16 between the first and second flanges 34, 36. When the slacked extent of the power cord 14 is wound about the barrel 28, the user inserts a tag end of the slacked extent of the power cord 14 into the channel 46 defined by the second flange 36, such that the wound state of the power cord 14 about the cord holder 16 is yieldingly maintained. Next, the user moves the cord holder 16 from the detached condition 20 to the attached condition 18, wherein the first flange 34 abuts the body 12 of the stand mixer 22 and is maintained in that position via magnetic attraction between the body 12 and the magnet 24 of the cord holder 16.

The appliance 10 of the present disclosure may provide a variety of advantages. First, the cord holder 16 being operable between the attached and detached conditions 18, 20 relative to the appliance 10 may conveniently allow a user to freely hold the cord holder 16 separately from the body 12 of the appliance 10 while winding the power cord 14 about the barrel 28. Second, the channel 46 extending across the entirety of the second flange 36, and interrupting the outer periphery 42 of the second flange 36 may allow for a length of the power cord 14 to be received within the channel 46 in an orientation that is substantially parallel to the length of the channel 46 (i.e., perpendicular to the longitudinal direction 44 of the second flange 36). A lengthwise extent of the power cord 14 being received by the channel 46 in this way results in a larger amount of surface area of the power cord 14 being contacted and retained by the channel-defining portions of the second flange 36. This results in better overall retention of the power cord 14 within the channel 46 compared to an apparatus in which a power cord is received within a channel while extending perpendicularly relative to the lengthwise direction of the channel. The power cord 14 being received within the channel 46 parallel to the length of the channel 46 is particularly advantageous in the present application, as power cords for appliances 10, such as the stand mixer 22, are often more rigid and unruly than flexible cords, such as those used for headphones. Third, the cord holder 16 being operable to magnetically attach to the body 12 of the appliance 10 may allow for a user to conveniently conceal the cord holder 16 and the power cord 14 wrapped about the cord holder 16 from view by attaching the cord holder 16 to various portions of the body 12 depending on the orientation of the appliance 10 relative to the user's viewpoint.

According to one aspect of the present disclosure, a kitchen appliance includes a body, a power cord extending outward from the body, and a cord holder configured to receive the power cord via wrapping of the power cord about the cord holder. The cord holder is operable between an attached condition and a detached condition. In the attached condition, the cord holder is attached to the body via magnetic attraction. In the detached condition, the cord holder is detached from the body.

According to another aspect, the body comprises a ferromagnetic metal, and the cord holder comprises a magnet that is magnetically attracted to the ferromagnetic metal.

According to another aspect, the kitchen appliance is a countertop kitchen appliance.

According to another aspect, the kitchen appliance is a stand mixer.

According to another aspect, the cord holder includes a barrel about which the power cord is configured to be wound. The barrel has a first end and a second end opposite the first end. The cord holder also includes a first flange extending outward from the first end of the barrel. The cord holder further includes a second flange extending outward from the second end of the barrel opposite the first end. The cord holder additionally includes a magnet that magnetically attaches the cord holder to the body in the attached condition of the cord holder. The magnet is oriented such that a side of the first flange opposite the barrel is configured to abut the body in the attached condition of the cord holder.

According to another aspect, the magnet is coupled to the first flange.

According to another aspect, the second flange defines a channel for receiving a portion of the power cord.

According to another aspect, the second flange has a substantially stadium-shaped outer periphery that is elongated in a longitudinal direction of the second flange.

According to another aspect, the channel interrupts the outer periphery of the second flange and extends across the second flange in a direction substantially perpendicular to the longitudinal direction of the second flange.

According to another aspect, the cord holder further includes a retention tab that extends outward from the first flange toward the second flange. The retention tab is in a spaced-relationship with the barrel and is configured to selectively retain a portion of the power cord between the retention tab and the barrel.

According to another aspect of the present disclosure, a cord holder for selective attachment to an appliance includes a barrel about which a power cord of the appliance is configured to be wound. The barrel has a first end and a second end opposite the first end. The cord holder also includes a first flange extending outward from the first end of the barrel. The cord holder further includes a second flange extending outward from the second end of the barrel and having a substantially stadium-shaped outer periphery that is elongated in a longitudinal direction of the second flange. The second flange defines a channel that interrupts the substantially stadium-shaped outer periphery of the second flange and extends across the second flange in a direction substantially perpendicular to the longitudinal direction. The cord holder additionally includes a magnet that is configured to magnetically attach the cord holder to a body of the appliance in an attached condition of the cord holder. The magnet is oriented such that a side of the first flange opposite the barrel is configured to abut the body in the attached condition of the cord holder.

According to another aspect, the first flange includes a substantially stadium-shaped outer periphery that is elongated in a longitudinal direction of the first flange.

According to another aspect, the longitudinal direction of the first flange is substantially parallel to the longitudinal direction of the second flange.

According to another aspect, the cord holder further includes a retention tab that extends outward from the first flange toward the second flange. The retention tab is in a spaced-relationship with the barrel and is configured to selectively retain a portion of the power cord between the retention tab and the barrel.

According to another aspect, the magnet is a portion of the first flange.

According to yet another aspect of the present disclosure, a kitchen appliance includes a body, a power cord extending outward from the body, and a cord holder configured to receive the power cord via wrapping of the power cord about the cord holder. The cord holder is operable between an attached condition and a detached condition. In the attached condition, the cord holder is attached to the body via magnetic attraction. In the detached condition, the cord holder is detached from the body. The cord holder includes a barrel about which the power cord is configured to be wound. The barrel has a first end and a second end opposite the first end. The cord holder also includes a first flange extending outward from the first end of the barrel. The cord holder further includes a second flange extending outward from the second end of the barrel and having a substantially stadium-shaped outer periphery that is elongated in a longitudinal direction of the second flange. The second flange defines a channel that interrupts the substantially stadium-shaped outer periphery of the second flange and extends across the second flange in a direction substantially perpendicular to the longitudinal direction. The cord holder additionally includes a magnet that is configured to magnetically attach the cord holder to the body of the kitchen appliance in the attached condition of the cord holder. The magnet is oriented such that a side of the first flange opposite the barrel is configured to abut the body in the attached condition of the cord holder.

According to another aspect, the kitchen appliance is a countertop kitchen appliance.

According to another aspect, the kitchen appliance is a stand mixer.

According to another aspect, the cord holder further includes a retention tab that extends outward from the first flange toward the second flange. The retention tab is in a spaced-relationship with the barrel and is configured to selectively retain a portion of the power cord between the retention tab and the barrel.

According to another aspect, the magnet is a portion of the first flange.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A kitchen appliance, comprising:

a body;

a power cord extending outward from the body; and a cord holder configured to receive the power cord via wrapping of the power cord about the cord holder, wherein the cord holder is operable between an attached condition, wherein the cord holder is attached to the body via magnetic attraction, and a detached condition, wherein the cord holder is detached from the body, the cord holder comprising:

a barrel about which the power cord is configured to be wound, the barrel having a first end and a second end opposite the first end;

a first flange extending outward from the first end of the barrel; and a second flange extending outward from the second end of the barrel opposite the first end, wherein the second flange defines a single channel that interrupts both sides of an outer periphery of the second flange, and wherein the channel extends across the second flange in a direction substantially perpendicular to a longitudinal direction of the second flange.

2. The kitchen appliance of claim 1, wherein the body comprises a ferromagnetic metal, and the cord holder comprises a magnet that is magnetically attracted to the ferromagnetic metal.

3. The kitchen appliance of claim 1, wherein said kitchen appliance is a countertop kitchen appliance.

4. The kitchen appliance of claim 1, wherein said kitchen appliance is a stand mixer.

5. The kitchen appliance of claim 1, wherein the cord holder further comprises:

a magnet that magnetically attaches the cord holder to the body in the attached condition of the cord holder, wherein the magnet is oriented such that a side of the first flange opposite the barrel is configured to abut the body in the attached condition of the cord holder.

6. The kitchen appliance of claim 5, wherein the magnet is coupled to the first flange.

7. The kitchen appliance of claim 1, wherein the channel is configured to receive the power cord, and when the channel receives the power cord, channel-defining portions of the second flange that define the channel elastically deform, thereby yieldingly retaining the power cord within the channel.

8. The kitchen appliance of claim 1, wherein the outer periphery of the second flange is substantially stadium-shaped and is elongated in the longitudinal direction of the second flange.

9. The kitchen appliance of claim 1, wherein the cord holder further comprises:

a retention tab that extends outward from the first flange toward the second flange, wherein the retention tab is in a spaced-relationship with the barrel and is configured to selectively retain a portion of the power cord between the retention tab and the barrel.

10. The kitchen appliance of claim 1, wherein the channel is further defined by the barrel.

11. A kitchen appliance, comprising:

a body;

a power cord extending outward from the body;

a cord holder configured to receive the power cord via wrapping of the power cord about the cord holder, wherein the cord holder is operable between an attached condition, wherein the cord holder is attached to the body via magnetic attraction, and a detached condition, wherein the cord holder is detached from the body, the cord holder comprising:

a barrel about which the power cord is configured to be wound, the barrel having a first end and a second end opposite the first end;

a first flange extending outward from the first end of the barrel;

a second flange extending outward from the second end of the barrel and having a substantially stadium-shaped outer periphery that is elongated in a longitudinal direction of the second flange, wherein the second flange defines a channel that interrupts the substantially stadium-shaped outer periphery of the second flange and extends across the second flange in a direction substantially perpendicular to the longitudinal direction; and a magnet that is configured to magnetically attach the cord holder to the body of said kitchen appliance in the attached condition of the cord holder, wherein the magnet is disposed within the barrel and oriented such that a side of the first flange opposite the barrel is configured to abut the body in the attached condition of the cord holder.

12. The kitchen appliance of claim 11, wherein said kitchen appliance is a countertop kitchen appliance.

13. The kitchen appliance of claim 11, wherein said kitchen appliance is a stand mixer.

14. The kitchen appliance of claim 11, wherein the cord holder further comprises:

a retention tab that extends outward from the first flange toward the second flange, wherein the retention tab is in a spaced-relationship with the barrel and is configured to selectively retain a portion of the power cord between the retention tab and the barrel.

15. The kitchen appliance of claim 11, wherein when the power cord is received by the channel, the power cord extends substantially perpendicular to the longitudinal direction of the second flange and across the entirety of the second flange.

* * * * *